(12) United States Patent
Yokoyama et al.

(10) Patent No.: US 8,616,319 B2
(45) Date of Patent: Dec. 31, 2013

(54) MOUNTING STRUCTURE FOR VEHICLE BATTERY BOX

(75) Inventors: Yutaka Yokoyama, Tokyo (JP); Kenji Inakoshi, Tokyo (JP); Arihiro Yamada, Tokyo (JP); Takaaki Fujitani, Tokyo (JP); Hiroyuki Tanaka, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 253 days.

(21) Appl. No.: 13/155,467

(22) Filed: Jun. 8, 2011

(65) Prior Publication Data

US 2011/0315464 A1 Dec. 29, 2011

(30) Foreign Application Priority Data

Jun. 25, 2010 (JP) .................... 2010-145258

(51) Int. Cl.
*B60R 16/04* (2006.01)

(52) U.S. Cl.
USPC ........................ 180/68.5; 200/61.08

(58) Field of Classification Search
USPC ............ 180/68.5, 282, 283, 279; 200/61.08, 200/DIG. 17; 429/100
See application file for complete search history.

(56) References Cited

U.S. PATENT DOCUMENTS

| | | | |
|---|---|---|---|
| 2,037,779 A * | 4/1936 | Granor | 200/61.52 |
| 5,476,151 A * | 12/1995 | Tsuchida et al. | 180/274 |
| 5,535,842 A * | 7/1996 | Richter et al. | 180/279 |
| 5,555,950 A * | 9/1996 | Harada et al. | 180/65.1 |
| 5,877,563 A * | 3/1999 | Krappel et al. | 307/10.1 |
| 6,386,611 B1 * | 5/2002 | Buchfink et al. | 296/37.1 |
| 7,144,039 B2 * | 12/2006 | Kawasaki et al. | 280/784 |
| 7,410,020 B2 * | 8/2008 | Kikuchi et al. | 180/68.5 |
| 7,690,686 B2 * | 4/2010 | Hashimura et al. | 280/782 |
| 8,037,960 B2 * | 10/2011 | Kiya | 180/68.5 |
| 8,051,934 B2 * | 11/2011 | Kiya et al. | 180/68.5 |
| 8,308,502 B2 * | 11/2012 | Lang | 439/475 |
| 8,432,246 B2 * | 4/2013 | Suzuki | 337/157 |
| 2007/0054157 A1 * | 3/2007 | Ryu et al. | 429/7 |
| 2007/0215399 A1 * | 9/2007 | Watanabe et al. | 180/68.5 |
| 2009/0159354 A1 * | 6/2009 | Jiang et al. | 180/68.5 |
| 2010/0247980 A1 * | 9/2010 | Jang et al. | 429/10 |

FOREIGN PATENT DOCUMENTS

| | | | |
|---|---|---|---|
| JP | 2006-306238 | * | 11/2006 |
| JP | 2006-306238 A | | 11/2006 |
| JP | 2007-259653 | * | 10/2007 |

* cited by examiner

*Primary Examiner* — Katy M Ebner
*Assistant Examiner* — Emma K Frick
(74) *Attorney, Agent, or Firm* — McDermott Will & Emery LLP

(57) ABSTRACT

In a mounting structure for a vehicle battery box, a battery box is supported in a suspended manner between left and right rear side frames at the rear of a vehicle with first and second cross members that are installed between the left and right rear side frames. The first cross member is fixed at a substantially front end of a rear deformation zone that is set at the left and right rear side frames. High-voltage equipment is fixed between the first and second cross members on the top surface of the right rear side frame. The battery box is electrically connected to the high-voltage equipment with a connecting member.

4 Claims, 7 Drawing Sheets

MOUNTING STRUCTURE FOR VEHICLE BATTERY BOX

CROSS REFERENCES TO RELATED APPLICATIONS

The present application claims priority from Japanese Patent Application No. 2010-145258 filed on Jun. 25, 2010, the entire contents of which are hereby incorporated by reference.

BACKGROUND OF THE INVENTION

1. Field of the Invention

The present invention relates to a mounting structure for a vehicle battery box, especially for a battery box that houses a high-voltage battery for hybrid vehicles, electric vehicles and the like.

2. Description of the Related Art

Japanese Unexamined Patent Application Publication (JP-A) No. 2006-30623 discloses an example of a structure for a vehicle battery box that is mounted on a hybrid vehicle, an electric vehicle and the like, the structure being designed with a consideration of a vehicle collision. In the structure for a vehicle battery box disclosed in JP-A No. 2006-30623, a case mounted on a vehicle is configured with a first case and a second case. The first case houses a battery. The first case and the second case are separated by an impact of a collision, and the second case is pressed into the first case, whereby the first case is tilted.

However such a structure for a vehicle battery box as disclosed in JP-A No. 2006-306238, which is crushed upon a vehicle collision while moving the battery to ensure safety leaves the battery electrically connected to a high-voltage circuit after the battery is moved. If the battery continues to be fed with electricity by the high-voltage circuit, an accident may occur such as an electric shock and a spark.

SUMMARY OF THE INVENTION

The present invention is made in view of the above, and it is an object of the present invention to provide a structure of a vehicle battery box that mechanically and properly disconnects the electrical connection between a battery and a high-voltage circuit when an impact is applied that moves the battery box, reliably prevents an accident such as an electric shock and a spark, whereby improving securing safety of an occupant and safety upon rescue work and repair work.

DESCRIPTION OF THE PREFERRED EMBODIMENTS

Figure 1:
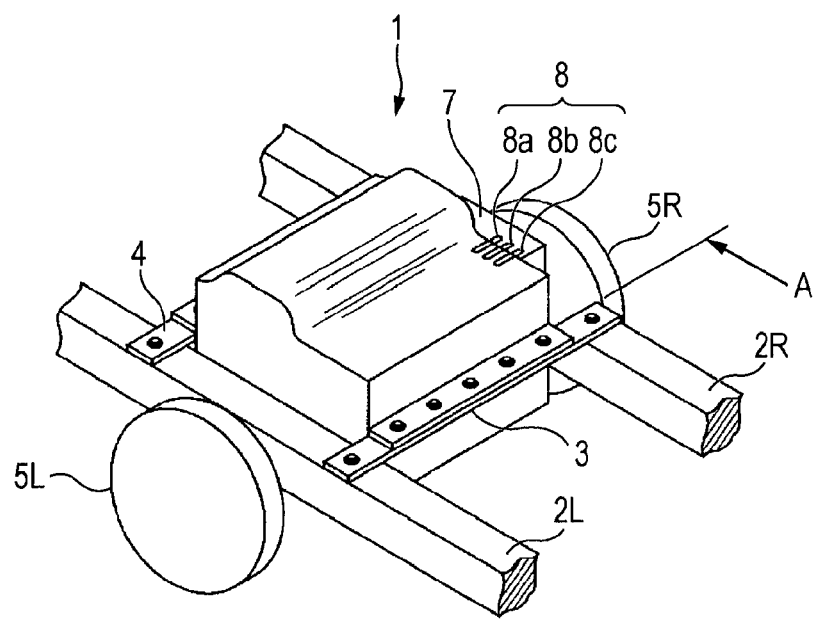
FIG. 1 is a perspective view of a battery box, high-voltage equipment and a connecting member at the rear of a vehicle according to an embodiment of the present invention.

Embodiments of the present invention will hereunder be described with reference to the drawings.

In FIGS. 1 to 4, reference numeral 1 denotes a battery box that houses a high-voltage battery for a hybrid vehicle and an electric vehicle. The battery box 1 is supported in a suspended manner between a left rear side frame 2L and a right rear side frame 2R of a vehicle with a first cross member 3 and a second cross member 4 that are installed between the left and right rear side frames 2L and 2R.

A crushable zone (rear deformation zone) A is set in a region from the rear end of the left and right rear side frames 2L and 2R to a neighborhood of the rear of wheels 5L and 5R. The crushable zone (rear deformation zone) A is deformed by an input of a predetermined impact force from the rear due to a collision or the like (for example, an impact force that is as large as to deploy an airbag), thereby absorbing the impact force. The first cross member 3 is disposed at a substantially front end of the rear deformation zone A, and the front of the battery box 1 is supported by the second cross member 4. Reference numeral 6 in the drawings denotes a rear wheel final reduction gear disposed under the battery box 1.

High-voltage equipment is fixedly installed between the first and second cross members 3 and 4 on the top surface of the right rear side frame 2R. The high-voltage equipment 7 includes an inverter, a DC-DC converter and the like, and is electrically connected to the battery box 1 with a connecting member 8. The region between the first and second cross members 3 and 4 is less deformed compared to the rear deformation zone A when the predetermined impact force from the rear due to a collision or the like is input.

Figure 5:
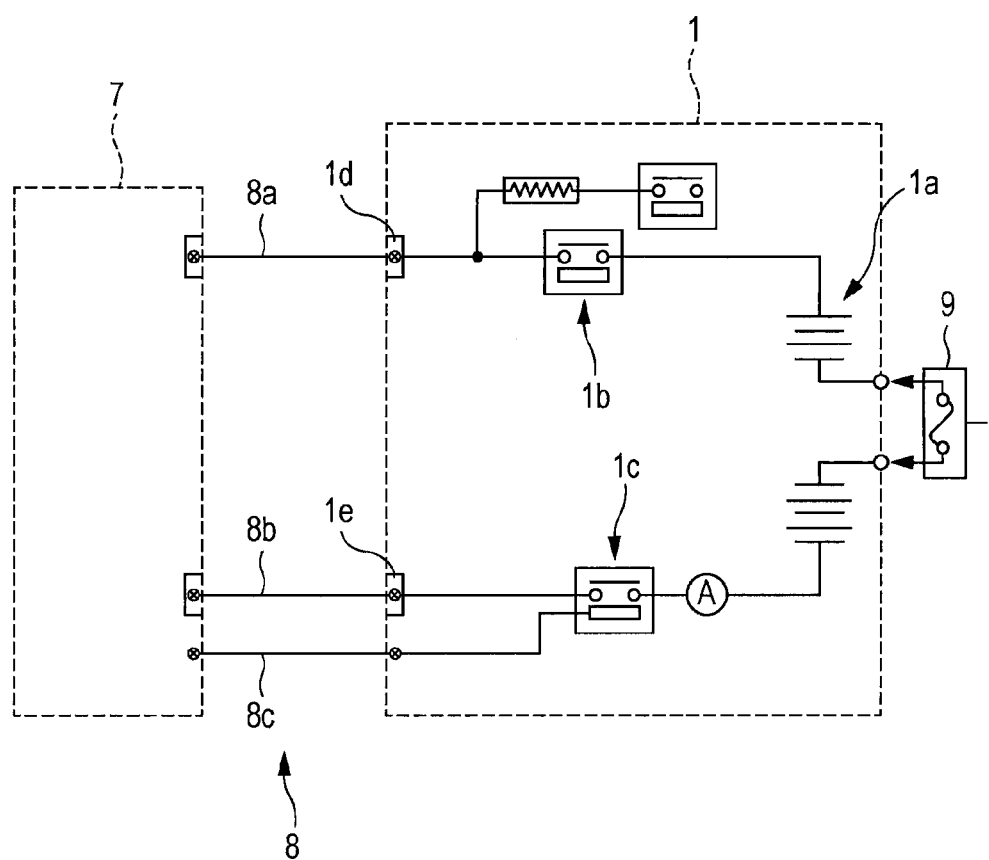
FIG. 5 is an electric circuit diagram explaining an electrical connection between the battery box and the high-voltage equipment according to the embodiment of the present invention.

FIG. 5 is an electric circuit diagram explaining an electrical connection between the battery box 1 and the high-voltage equipment 7. The battery box includes a battery 1a therein, and a positive electrode and a negative electrode of the battery 1a are respectively connected to a positive electrode terminal 1d and a negative electrode terminal 1e via disconnectable relay circuits 1b and 1c. The battery box 1 are connected to the high-voltage equipment 7 from the positive electrode terminal 1d and the negative electrode terminal 1e via a positive-side connecting wire 8a and a negative-side connecting wire 8b. In this embodiment, a power supply wire 8c that makes a relay contact of the relay circuit 1c in a connection state by feeding electricity is connected between the battery box 1 and the high-voltage equipment 7. Reference numeral 9 in the FIG. 5 shows a service plug that is used for maintenance, service and the like.

Figure 2:
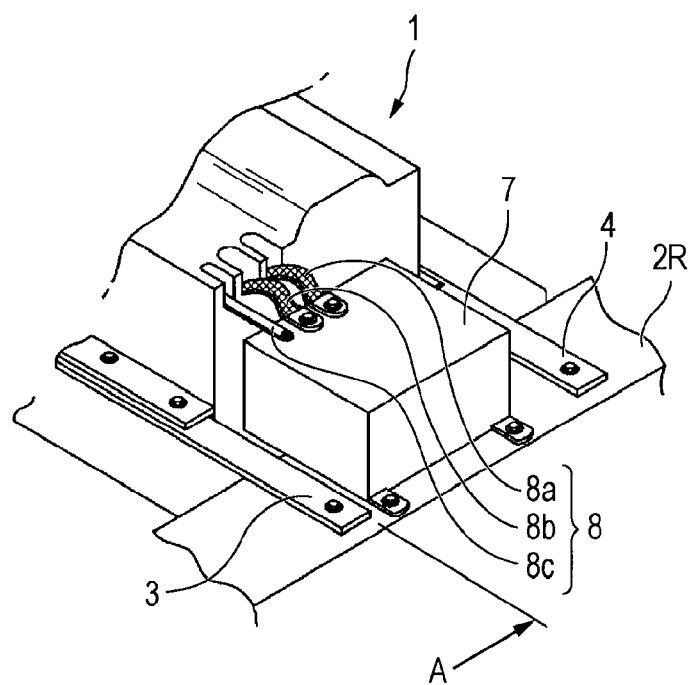
FIG. 2 is an enlarged perspective view of the battery box, the high-voltage equipment and the connecting member according to the embodiment of the present invention.
Figure 3:
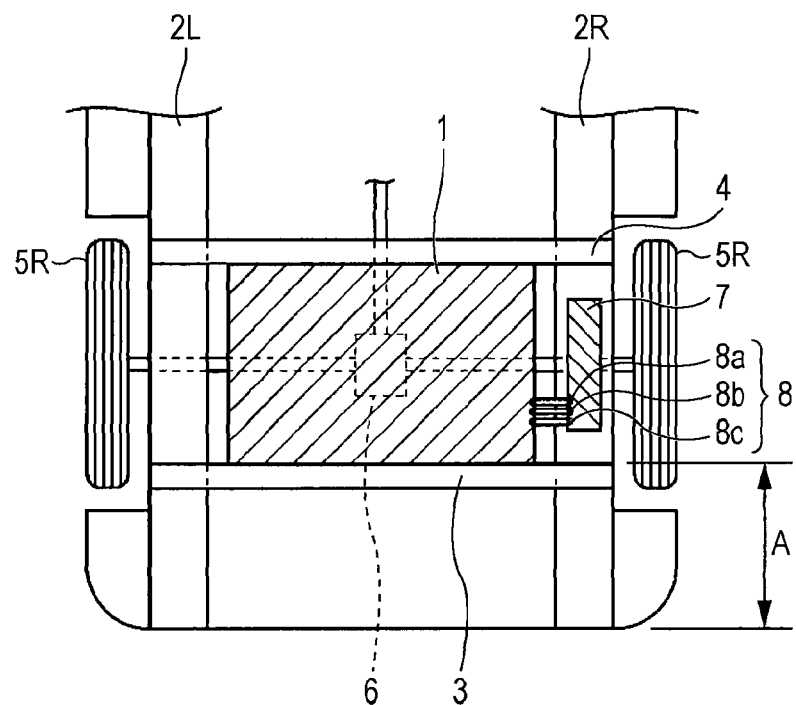
FIG. 3 is a schematic top view explaining the battery box, the high-voltage equipment and the connecting member at the rear of the vehicle according to the embodiment of the present invention.
Figure 4:
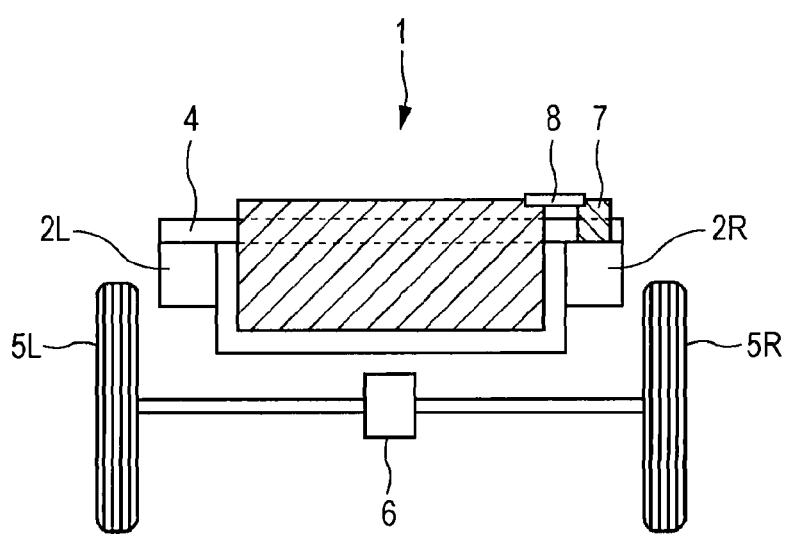
FIG. 4 is a schematic view explaining the battery box, the high-voltage equipment and the connecting member at the rear of the vehicle according to the embodiment of the present invention, the view seen from the rear.

As shown in FIG. 2, the positive-side connecting wire 8a and the negative-side connecting wire 8b of the connecting member 8 are formed with, for example, a flexible connecting wire such as a flat braided wire, while the power supply wire 8c is formed with, for example, an inflexible wire such as a bus bar. Consequently, when a force is applied to the connecting member 8, the power supply wire 8c is cut first, and the positive-side connecting wire 8a, and thereafter the negative-side connecting wire 8b are cut.

Next, a rear collision of the vehicle configured as above will be explained with FIGS. 6 to 8. When the vehicle is in a normal state, as shown in FIG. 6, the battery box 1 is supported in a suspended manner between the left and right rear side frames 2L and 2R at the rear of the vehicle by the first and second cross members 3 and 4 which are installed between the left and right rear side frames 2L and 2R.

The high-voltage equipment 7 is fixedly installed between the first and second cross members 3 and 4 on the top surface of the right rear side frame 2R. The high-voltage equipment 7 is electrically connected to the battery box 1 with the connecting member 8.

Figure 6:
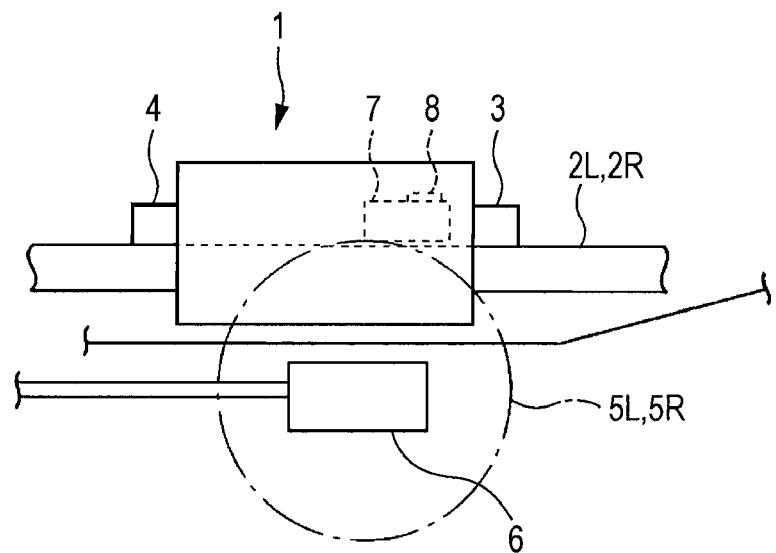
FIG. 6 is an explanatory view showing the battery box, the high-voltage equipment and the connecting member at the rear of the vehicle in a normal state according to the embodiment of the present invention.
Figure 7:
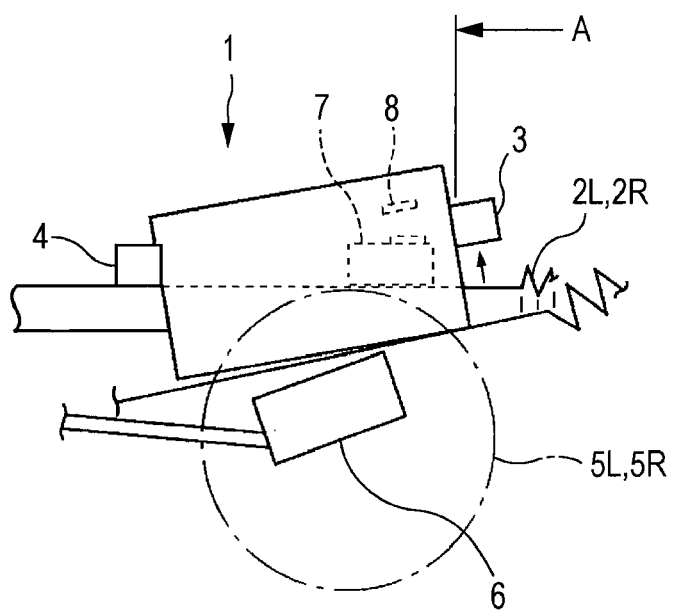
FIG. 7 is an explanatory view showing the battery box, the high-voltage equipment and the connecting member at the rear of the vehicle upon a collision according to the embodiment of the present invention.
Figure 8:
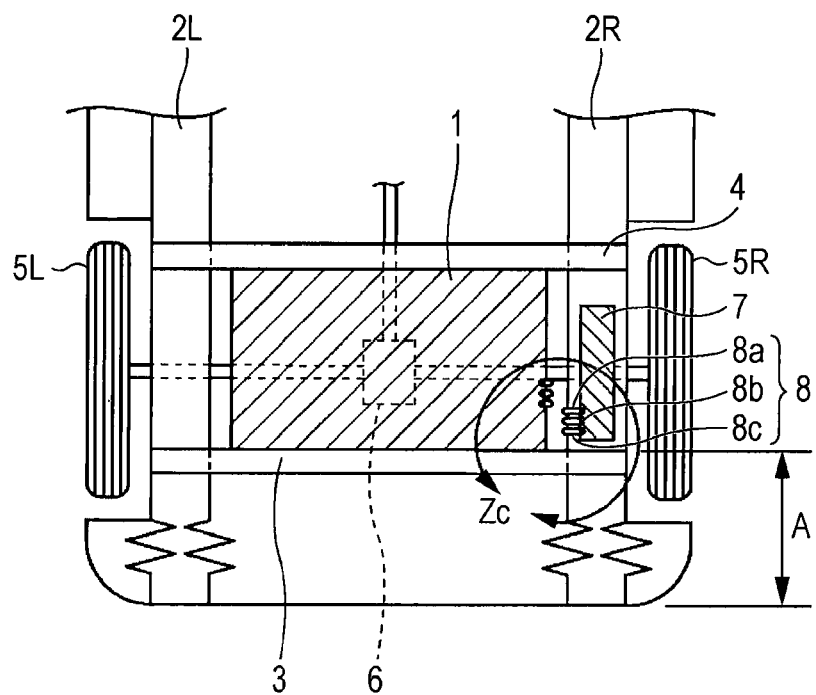
FIG. 8 is a schematic top view of the battery box, the high-voltage equipment and the connecting member at the rear of the vehicle upon the collision according to the embodiment of the present invention.

When a rear collision occurs in the state shown in FIG. 6, and a predetermined impact force from the rear due to a collision or the like (for example, an impact force that is as large as to deploy an airbag) is input, as shown in FIGS. 7 and 8, the rear deformation zone A set at the rear end of the left and right rear side frames 2L and 2R is deformed from the rear, thereby absorbing the impact force.

In addition, as a result of the rear collision, the rear wheel final reduction gear 6 is moved upward and the battery box is also lifted up. Consequently, the cross member 3 disposed at the substantially front end of the rear deformation zone A set at the rear end of the left and right rear side frames 2L and 2R is also forced forward and moved, as well as lift upward. (At this time, the connecting parts of the first cross member with the left and right rear side frames 2L and 2R are ruptured).

Upon the rear collision, the high-voltage equipment 7 is not moved and remains on the top surface of the right rear side frame 2R between the first and second cross members 3 and 4. On the other hand, the movement of the battery box 1 causes stress to be concentrated on the connecting member 8, which is thereby ruptured as shown in Zc of FIG. 8.

The positive-side connecting wire 8a and negative-side connecting wire 8b of the connecting member 8 are formed with a flexible connecting wire, and the power supply wire 8c thereof is formed with an inflexible wire. Accordingly, when the connecting member 8 is ruptured, the power supply wire 8c is ruptured first, and thereafter the positive-side connecting wire 8a and the negative-side connecting wire 8b are ruptured. Therefore, when then connecting member 8 is ruptured first, the power distribution to the battery circuit is disconnected, and thereafter the positive-side connecting wire 8a and the negative-side connecting wire 8b are ruptured. Consequently, the electrical connection between the high-voltage equipment 7 and the battery box 1 are disconnected safely. Furthermore, no high voltage is generated in the ruptured positive-side connecting wire 8a and negative-side connecting wire 8b.

Even if the cross member 3 is not forced both forward and upward but forced in either of the directions, the relative position of the high-voltage equipment 7 and the battery box 1 is changed, whereby the connecting member 8 is reliably ruptured.

On the other hand, in an event of a light rear collision, the rear deformation zone A set at the rear end of the left and right rear side frames 2L and 2R is deformed to a small extent to absorb an impact force. Consequently, the first cross member 3 is not forward front or moved, and the battery box is not moved upward, and thus the connecting member 8 is not ruptured.

According to the embodiment of the present invention described above, when an impact that moves the battery box 1 is applied, the electrical connection between the battery box 1 and the high-voltage equipment 7 is disconnected mechanically and properly, an accident such as an electric shock and a spark is reliably prevented, whereby securing safety of an occupant and safety upon rescue work and repair work can be improved. In addition, since the rupture state of the connecting member 8 can be visually observed, high convenience is achieved, and rescue work and repair work can be performed with securing safety.

Figure 9:
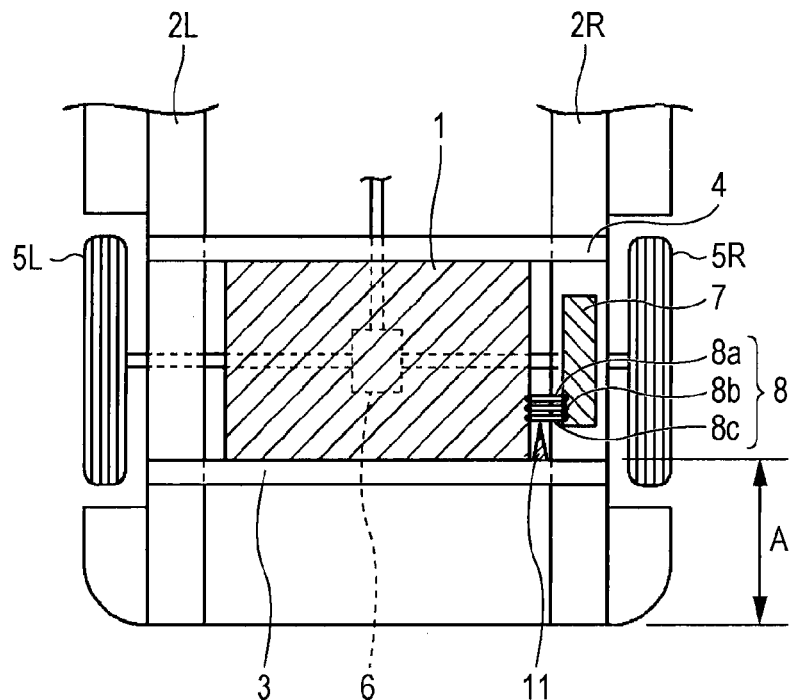
FIG. 9 is a schematic top view of a connecting member at the rear of a vehicle according to another embodiment of the present invention, the connecting member provided with a cutting member.
Figure 10:
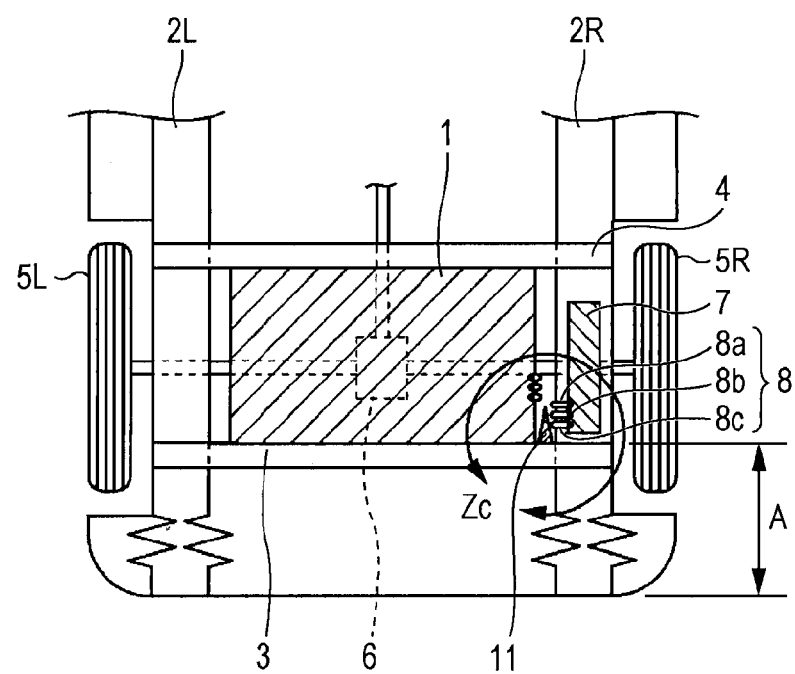
FIG. 10 is a schematic top view of the rear of the vehicle explaining cutting of the connecting member by the cutting member upon a collision according to the embodiment of the present invention.

As shown in FIGS. 9 and 10, a cutting member 11 for cutting the connecting member 8 by the forward movement of the first cross member 3 may be provided at a position where the first cross member and the connecting member 8 face with each other. The cutting member 11 is preferably a sword-shaped, hard resin member so as to maintain electrical isolation upon the cutting. If such a cutting member 11 is provided when a rear collision occurs such that a predetermined impact force from the rear due to a collision or the like is input and the first cross member 3 is moved forward, the connecting member 8 is quickly cut by the cutting member 11 as shown FIG. 10, whereby the electrical connection between the battery box 1 and the high-voltage equipment 7 can be disconnected mechanically and properly. Furthermore, a desired cutting timing can be set by setting an appropriate clearance between the cutting member 11 and the connecting member 8.

Figure 11:
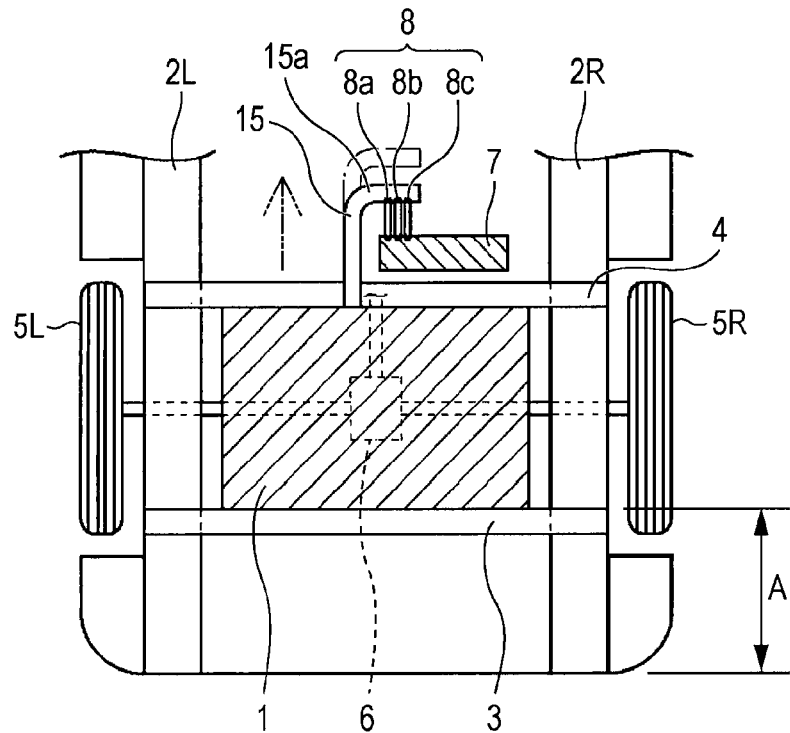
FIG. 11 is a schematic top view explaining a battery box, high-voltage equipment and a connecting member at the rear of a vehicle according to another embodiment of the present invention, wherein the high-voltage equipment is disposed ahead of a second cross member.

The present invention is applicable to a vehicle in which a high-voltage equipment 7 is disposed ahead of a second cross member 4 as shown in FIG. 11. Specifically, in the vehicle in the FIG. 11, the high-voltage equipment 7 is disposed ahead of the second cross member 4. A substantially L-shaped guide channel 15 for wiring connection extends from the battery box 1. A tip portion 15a of the guide channel 15 is bent such that the guide channel 15 extends from a side surface to a front surface of the high-voltage equipment 7. The tip portion 15a of the guide channel 15 is connected to the high-voltage equipment 7 via a connecting member 8 that is provided with, for example, a known spade terminal at an end thereof. Accordingly, when a rear collision occurs such that a predetermined impact a predetermined impact force from the rear due to a collision or the like is input, and the first cross member 3 is moved forward while the battery box is moved toward ahead, as shown with a dot-dash line in FIG. 11, the guide channel 15 is also moved forward, the connecting member 8 is ruptured, or the terminal thereof detaches from the spade terminal, whereby the electrical connection between the battery box 1 and the high-voltage equipment 7 can be disconnected mechanically and properly.

Figure 12:
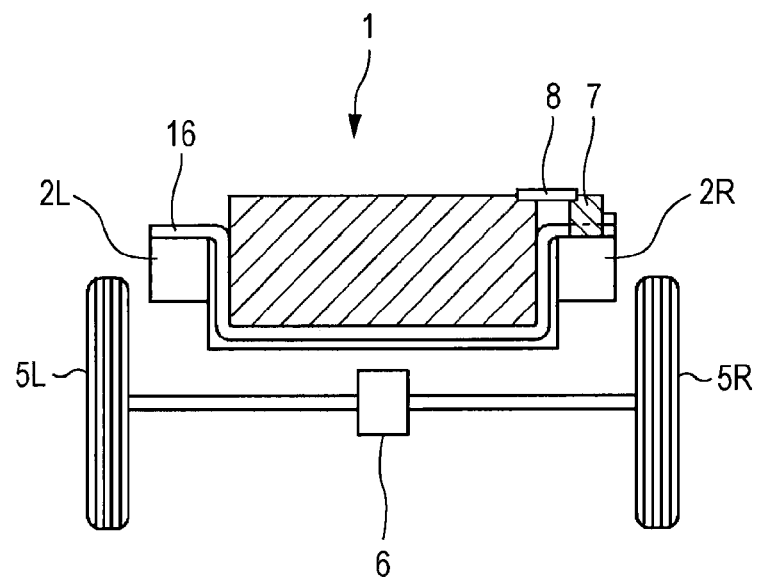
FIG. 12 is a schematic view seen from the rear explaining a battery box, high-voltage equipment and a connecting member at the rear of a vehicle according to another embodiment of the present invention, wherein a cross member with a different shape is employed.

The first and second cross members 3 and 4 of the embodiments explained above have a straight line shape, but the present invention is not limited thereto. For example, a cross member 16 shown in FIG. 12 may be used, the cross member having a shape the central part of which is recessed so that the battery box 1 is placed thereon. Furthermore, a cross member having another different shape may be used.

What is claimed is:

1. A mounting structure for a vehicle battery box comprising:
    a battery box that houses a battery;
    left and right rear side frames disposed at a rear portion of a vehicle;
    a rear deformation zone that is set at the left and right rear side frames and deformed by a predetermined impact force applied from rear of the vehicle;
    a first cross member that is installed at a substantially front end of the rear deformation zone between the left and right rear side frames and supports the battery box;
    high-voltage equipment that is disposed ahead of a position of the first cross member; and
    a connecting member that is electrically connected to the high-voltage equipment and the battery box, and is cut by a change in a relative position of the battery box to the high-voltage equipment, wherein:
    the connecting member is provided with a negative-side connecting wire that is connected to a negative electrode of the battery, a positive-side connecting wire that is connected to a positive electrode of the battery, a power supply wire for feeding electricity to an excitation circuit that makes a relay contact interposed on at least one of the negative-side connecting wire and the positive-side connecting wire in a connection state by feeding the electricity, and
    the negative-side connecting wire and the positive-side connecting wire are formed with a flexible connecting wire, while the power supply wire is formed with an inflexible wire.

2. The mounting structure for a vehicle battery box according to claim 1, wherein a second cross member is installed at a position ahead of the first cross member between the left and right rear side frames and supports the battery box together with the first cross member, and the high-voltage equipment is disposed between the first and second cross members on either of the left and right rear side frames.

3. The mounting structure for a vehicle battery box according to claim 1, wherein a cutting member for cutting the connecting member by forward movement of the first cross member is provided at a position where the first cross member and the connecting member face with each other.

4. The mounting structure for a vehicle battery box according to claim 1, wherein a second cross member is installed at a position ahead of the first cross member between the left and right rear side frames and supports the battery box together with the first cross member, and the high-voltage equipment is disposed ahead of position of the second cross member.

* * * * *